United States Patent [19]
Schweitzer

[11] 3,738,329
[45] June 12, 1973

[54] POULTRY FEEDER

[76] Inventor: Gordon Schweitzer, R.R. No. 2, Montrose, Ontario, Canada

[22] Filed: Dec. 11, 1970

[21] Appl. No.: 97,154

[52] U.S. Cl.......................... 119/63, 119/18, 119/61
[51] Int. Cl............................................. A01k 05/00
[58] Field of Search..................... 119/63, 61, 52 R, 119/52 AF, 18, 17

[56] References Cited
UNITED STATES PATENTS

| | | | |
|---|---|---|---|
| 2,234,406 | 3/1941 | Hatfield et al. | 119/61 |
| 963,968 | 7/1910 | Whitney | 119/52 R |
| 1,404,251 | 1/1922 | Westenberger et al. | 119/52 R |
| 2,918,037 | 12/1959 | Polley | 119/52 AF |

*Primary Examiner*—Hugh R. Chamblee
*Attorney*—Spencer & Kaye

[57] ABSTRACT

The invention relates to a poultry feeder and, in particular, to a chick feeder. The feeder basically comprises an open-topped trough adapted to contain the feed, the trough having a bottom and at least one upstanding wall. The wall has a number of circular holes formed in it and which are spaced a predetermined amount from the bottom of the wall. The wall is also provided with a slidable member having a corresponding number of circular holes. The arrangement is such that when the holes on the slide cooperate with the holes in the wall, a number of feeding apertures for the chicks' heads are provided, the entire shape of the feeding apertures being selectively adjustable from an elliptical shape to a circular shape by movement of the slide. The shape of the feeding apertures only permits introduction of the heads of the chicks into the trough and inhibits entry of the bodies. The selective adjustability of shape of the feeding apertures also compensates for the growth of the heads of the chicks.

8 Claims, 3 Drawing Figures

INVENTOR.
Gordon Schweitzer

POULTRY FEEDER

This invention relates to poultry feeders and, in particular, to the type of feeder suitable for chicks.

Poultry feeders are known in which one wall of the trough is provided with a plurality of spaced apertures and which are adapted to be increased or decreased in size by means of a cooperating slide member. However, this type of feeder has not been suitable for use with young chicks because the particular shape of the apertures has not prevented the entire chick from getting into the trough instead of the head only. Moreover, this type of feeder has also been unsuitable for use with the modern-day chick cages, arranged in staggered tiers, the feed troughs of which must be mechanically replenished by feed carts travelling along aisles between such cages.

Hence, it is the object of the present invention to provide a poultry feeder which will overcome the above disadvantages and which is of simple construction and relatively inexpensive to manufacture.

Accordingly, the present invention relates to a chick feeder comprising an open-topped trough adapted to contain poultry feed having a bottom and at least an upstanding side wall, a first plurality of spaced substantially circular apertures arranged in seriatim in said wall and spaced from the bottom of the latter, and a member slidably mounted on said wall; said member being provided with a second plurality of spaced and correspondingly shaped apertures and slidably cooperating with said wall to provide a plurality of feeding apertures the entire configuration of each of which is selectively adjustable from a substantially elliptical shape to a substantially circular shape so as to permit only the introduction of the head of a chick through a said feeding aperture and into said trough whilst inhibiting entry of the body of the chick into a said feeding aperture and compensating for the growth of the heads of the chicks.

The invention is illustrated by way of example in the accompanying drawings in which.

Figure 1:
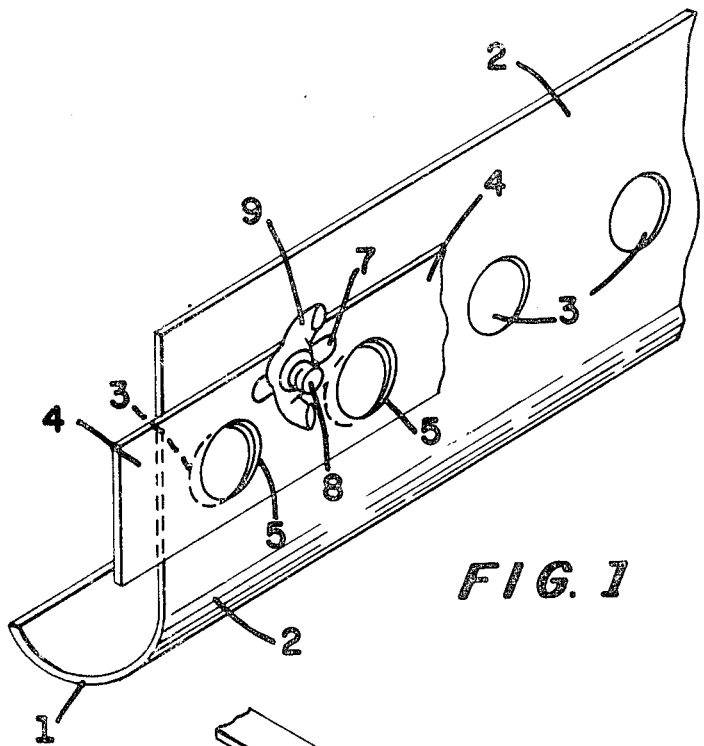
FIG. 1 is a perspective view of a simplified form of chick feeder.

Referring to the drawings and particularly to FIG. 1, it will be seen that the chick feeder comprises an open-topped trough having a bottom 1 so as to receive and retain the grain G. The trough also includes an upstanding side wall 2 provided with a first plurality spaced substantially circular apertures 3 arranged in seriatim in the wall and spaced from the bottom of the latter. A member 4 is slidably mounted on the outer face of the wall 2 and is provided with a second plurality of spaced and correspondingly shaped apertures 5, the member 5 being limited in its slidable movement in either direction by means of a bolt 8 and wing nut 9 in the wall 2 cooperating with a slot 7 formed in member 4.

Figure 2:
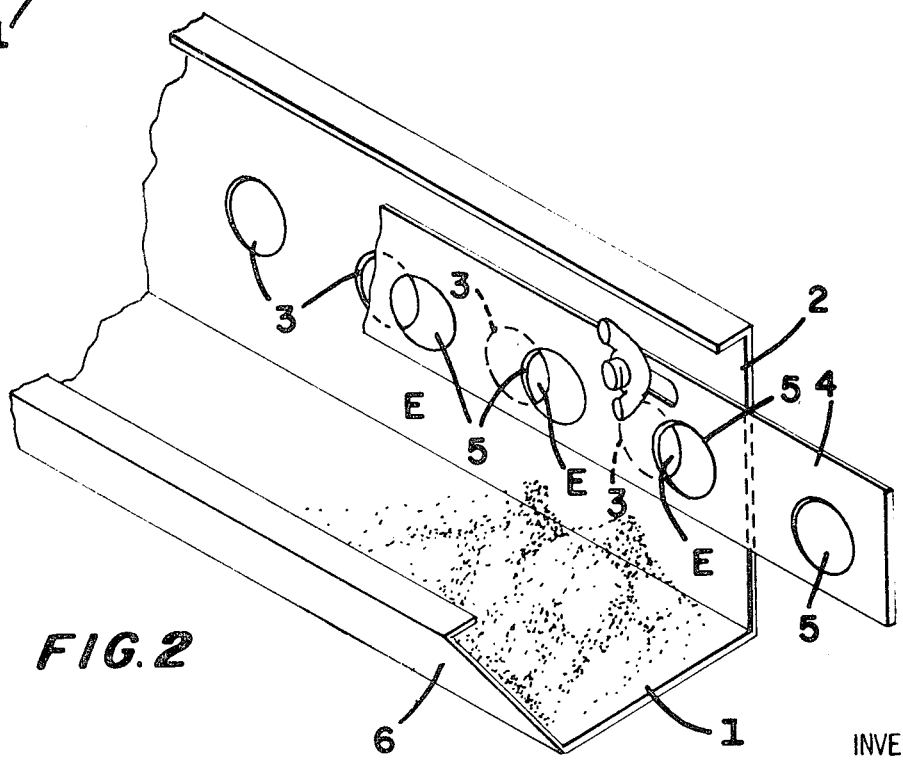
FIG. 2 is similar to FIG. 1 but of another form of chick feeder showing the slide member arranged so that the feeding apertures are substantially elliptical shaped.
Figure 3:
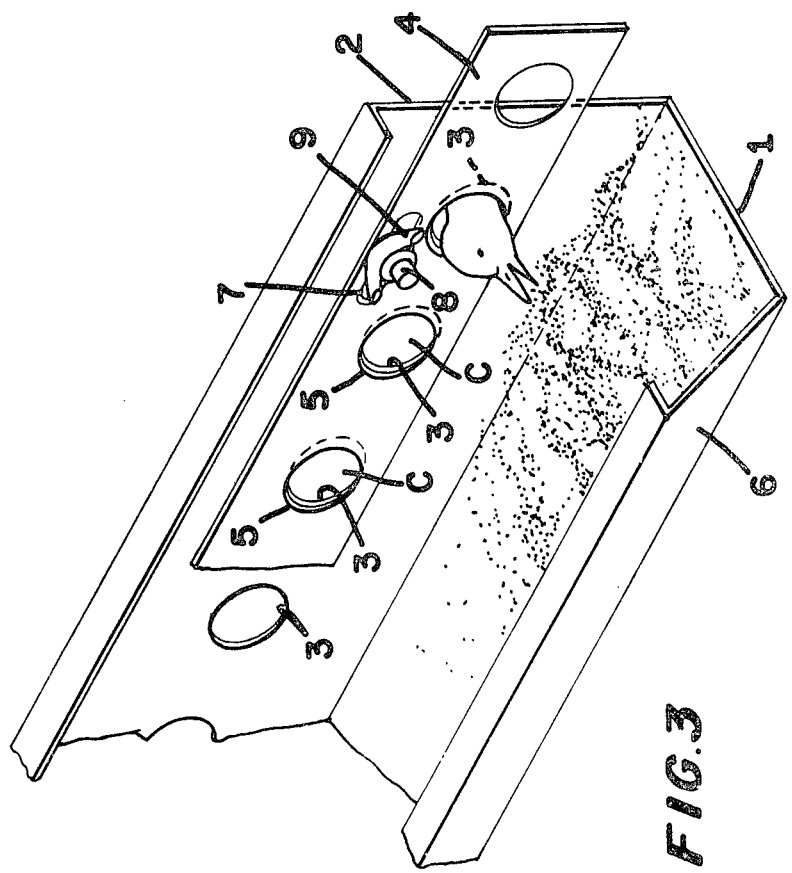
FIG. 3 is a view similar to FIG. 2 but showing the slide member positioned so that the feeding apertures are substantially circular in shape.

Turning now to FIGS. 2 and 3, it will be seen that in this form of the invention, an upstanding and angulated front wall 6 is connected to the bottom 1 of the trough and is mutually opposed to the upstanding rear wall 2. Moreover, in this case, the slidable member 4 is arranged in the inner face of the wall 2 as opposed to the outer face of the wall 2 of the feeder shown in FIG. 1. As will be seen from FIG. 2, the cooperation of the member 4 with the wall 2 provides a plurality of feeding apertures, the entire configuration of each of which is selectively adjustable from a substantially elliptical shape E shown in FIG. 2 to a substantially circular shape C shown in FIG. 3 so as to permit only the introduction of the head of a chick through a said feeding aperture and into the trough whilst inhibiting entry of the body of the chick into a feeding aperture and compensating for the growth of the heads of the chicks. This cooperation and the shape of the feeding apertures is the same for the type of feeding trough shown in FIG. 1.

Hence, by the two arrangements described above and illustrated in the accompanying drawings, it will be appreciated that the shape of the feeding apertures which will be considerably reduced for small chicks of an early age, will be increased as the chicks grow in size. When the head of the chick is too large to protrude through the circular feed aperture C, it will be able to put its head over the top of the wall 2 and still feed itself from the trough.

From the above two embodiments of the invention, it will be appreciated that the use of the chick feeder herein makes it unnecessary to raise, lower or adjust the height of the feeder trough as the chicks grow in size.

We claim:

1. A chick feeder comprising an open-topped trough adapted to contain poultry feed having a bottom and at least an upstanding side wall, a first plurality of spaced substantially circular apertures arranged in seriatim in said wall and spaced from the bottom of the latter, and a member slidably mounted on said wall, said member being provided with a second plurality of spaced and correspondingly shaped circular apertures and slidably cooperating with said wall to provide a plurality of feeding apertures the entire configuration of each of which is selectively adjustable in all directions from a substantially elliptical shape to a substantially circular shape so as to permit only the introduction of the head of a chick through said feeding aperture and into said trough whilst inhibiting entry of the body of the chick into a said feeding aperture and compensating for the growth of the heads of the chicks, said member being slidable into a position in which all the openings are closed thereby to increase the capacity of the trough.

2. A chick feeder according to claim 1 including a second side wall upstanding from said bottom and mutually opposed to said first upstanding side wall.

3. A chick feeder according to claim 2 wherein said slidable member is mounted on the inner face of the first upstanding side wall.

4. A chick feeder according to claim 2 wherein said slidable member is mounted on the outer face of the first upstanding side wall.

5. A chick feeder according to claim 3 wherein movement of said slidable member selectively controls the range of shapes of the feeding apertures.

6. A chick feeder according to claim 4 wherein movement of said slidable member selectively controls the range of shapes of the feeding apertures.

7. A chick feeder comprising an open-topped trough adapted to contain poultry feed having a bottom and at least an upstanding side wall, a first plurality of spaced substantially circular apertures of sufficient size to accommodate the heads of baby chicks but too small to accommodate the heads of older poultry and arranged in seriatim in said wall and spaced above said bottom at a height primarily to accommodate baby chicks, and a member slidably mounted on said wall, said member being provided with a second plurality of spaced and correspondingly shaped circular apertures and slidably cooperating with said wall to provide a plurality of feeding apertures the entire configuration of each of which is selectively adjustable in all directions from a substantially elliptical shape to a substantially circular shape so as to permit only the introduction of the head of a chick through said feeding aperture and into said trough whilst inhibiting entry of the body of the chick into a said feeding aperture and compensating for the growth of the heads of the chicks.

8. A chick feeder comprising an open-topped trough adapted to contain poultry feed having a bottom and at least an upstanding side wall, a first plurality of spaced substantially circular apertures of sufficient size to accommodate the heads of baby chicks but too small to accommodate the heads of older poultry and arranged in seriatim in said wall and spaced above said bottom at a height primarily to accommodate baby chicks, said wall being too high for baby chicks to feed over but sufficiently small that older poultry, the heads of which are not accommodated by said openings, can feed over said wall, and a member slidably mounted on said wall, said member being provided with a second plurality of spaced and correspondingly shaped circular apertures and slidably cooperating with said wall to provide a plurality of feeding apertures the entire configuration of each of which is selectively adjustable in all directions from a substantially elliptical shape to a substantially circular shape so as to permit only the introduction of the head of a chick through said feeding aperture and into said trough whilst inhibiting entry of the body of the chick into a said feeding aperture and compensating for the growth of the heads of the chicks.

* * * * *